United States Patent
Benson

(10) Patent No.: US 10,174,625 B2
(45) Date of Patent: Jan. 8, 2019

(54) BLADE

(71) Applicant: ROLLS-ROYCE plc, London (GB)

(72) Inventor: Christopher Benson, Swindon (GB)

(73) Assignee: ROLLS-ROYCE plc, London (GB)

( * ) Notice: Subject to any disclaimer, the term of this patent is extended or adjusted under 35 U.S.C. 154(b) by 168 days.

(21) Appl. No.: 14/954,355

(22) Filed: Nov. 30, 2015

(65) Prior Publication Data
US 2016/0177744 A1   Jun. 23, 2016

(30) Foreign Application Priority Data
Dec. 19, 2014 (GB) .................................. 1422737.5

(51) Int. Cl.
| F01D 5/14 | (2006.01) |
| F01D 5/28 | (2006.01) |
| F01D 21/04 | (2006.01) |
| F02C 7/05 | (2006.01) |

(52) U.S. Cl.
CPC ............. *F01D 5/282* (2013.01); *F01D 5/147* (2013.01); *F01D 21/045* (2013.01); *F02C 7/05* (2013.01); *F05D 2220/32* (2013.01); *F05D 2230/30* (2013.01); *F05D 2240/303* (2013.01); *F05D 2300/10* (2013.01); *F05D 2300/50* (2013.01)

(58) Field of Classification Search
None
See application file for complete search history.

(56) References Cited

U.S. PATENT DOCUMENTS

| 4,111,600 | A |   | 9/1978 | Rothman et al. |
| 4,944,655 | A | * | 7/1990 | Merz ....................... B64C 11/26 416/146 R |
| 7,780,410 | B2 | * | 8/2010 | Kray ....................... B23P 15/04 415/9 |
| 8,814,527 | B2 | * | 8/2014 | Huth ..................... B64C 11/205 416/224 |
| 2008/0075601 | A1 | * | 3/2008 | Giusti ..................... F01D 5/147 416/229 A |
| 2010/0054937 | A1 |   | 3/2010 | Beckford et al. |
| 2010/0054945 | A1 | * | 3/2010 | McMillan ............... F01D 5/282 416/223 A |
| 2012/0301292 | A1 | * | 11/2012 | Deal ....................... F01D 5/147 415/220 |
| 2013/0004323 | A1 |   | 1/2013 | Hansen et al. |

(Continued)

FOREIGN PATENT DOCUMENTS

| EP | 1 022 432 A2 | 7/2000 |
| EP | 1 754 857 A2 | 2/2007 |

(Continued)

OTHER PUBLICATIONS

Jun. 7, 2016 Search Report issued in European Patent Application No. 15196977.

(Continued)

*Primary Examiner* — Jason D Shanske
*Assistant Examiner* — Theodore Ribadeneyra
(74) *Attorney, Agent, or Firm* — Oliff PLC

(57) ABSTRACT

A turbomachine blade comprising a metallic leading edge having a region having varying fracture resistance in a spanwise direction so as to increase energy absorption by the leading edge in the event of the blade being released from a turbomachine and impacting a casing of the turbomachine.

13 Claims, 6 Drawing Sheets

(56) References Cited

U.S. PATENT DOCUMENTS

| | | | | |
|---|---|---|---|---|
| 2013/0008027 A1* | 1/2013 | Franchet | ............... | B21D 53/78 |
| | | | | 29/889.71 |
| 2013/0199934 A1 | 8/2013 | Parkos, Jr. et al. | | |
| 2013/0239586 A1 | 9/2013 | Parkin et al. | | |
| 2015/0218953 A1* | 8/2015 | Bottome | ................ | F01D 5/147 |
| | | | | 416/224 |

FOREIGN PATENT DOCUMENTS

| | | | | |
|---|---|---|---|---|
| EP | 2 159 378 A2 | 3/2010 | | |
| FR | 2 994 708 A1 | 2/2014 | | |
| FR | 2994708 A1 * | 2/2014 | ............ | F01D 9/041 |

OTHER PUBLICATIONS

May 30, 2016 Search Report issued in European Patent Application No. 15196975.
Jun. 15, 2015 Search Report issued in British Patent Application No. GB1422741.7.
Jun. 15, 2015 Search Report issued in British Patent Application No. GB1422737.5.
Jun. 16, 2015 Search Report issued in British Patent Application No. GB1422738.3.
U.S. Appl. No. 14/954,087, filed Nov. 30, 2015 in the name of Christopher Benson.
U.S. Appl. No. 14/954,221, filed Nov. 30, 2015 in the name of Christopher Benson.
Jun. 1, 2018 Notice of Allowance issued in U.S. Appl. No. 14/954,221.
Oct. 19, 2017 Office Action issued in U.S. Appl. No. 14/954,221.
Nov. 2, 2017 Office Action issued in U.S. Appl. No. 14/954,087.

* cited by examiner

BLADE

FIELD OF INVENTION

The present invention relates to a turbomachine blade, in particular but not exclusively a fan blade for a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven directly off an additional lower pressure turbine in the engine core.

A fan of the gas turbine engine generally includes a plurality of blades mounted to a hub. A fan casing and liner circumscribe the fan blades. Fan blades may be metallic or have a composite construction. Generally a composite fan blade will have a composite non-metallic core, e.g. a core having fibres within a resin matrix. Typically a composite blade will have a metallic leading edge to prevent erosion and to protect the blade against impact damage from foreign objects. The metallic leading edge generally wraps around the leading edge of the composite core and covers a portion of the suction surface of the blade and a portion of the pressure surface of the blade.

In the event of the leading edge becoming detached from the remainder of the fan blade (e.g. if a fan blade is released from the hub), the construction of the leading edge means that it can apply high impact forces to the fan casing. The fan casing and liner can be designed to absorb the impact energy imparted by a released blade and leading edge. However, this generally leads to a heavy system that has associated efficiency penalties.

SUMMARY OF INVENTION

A first aspect of the invention provides a turbomachine blade comprising a metallic leading edge configured to have a region having varying fracture resistance in a spanwise direction.

Varying the fracture resistance along the spanwise length of the metallic leading edge can control the cracking or splitting up of the metallic leading edge. A more gradual and controlled break-up of the leading edge can absorb more energy than failure mechanisms of the prior art. Increasing the energy absorbed by the leading edge means that the fan casing and liner arrangement can be made lighter.

The blade may comprise a blade tip and a blade root.

The fracture resistance may vary in a direction extending between the blade tip and the blade root.

The blade may comprise a core. The core may be a composite core or a metallic core. The metallic leading edge may be provided at a leading edge or end of the core.

The blade may have a leading edge and a trailing edge; and a suction surface extending between the leading edge and the trailing edge and a pressure surface extending between the leading edge and the trailing edge. In the present application, a chordwise direction is a direction extending between the leading edge and the trailing edge; a spanwise direction is a direction extending between the tip of the blade and the root of the blade; and the thickness direction is a direction extending between the pressure surface and the suction surface of the blade.

A region of the metallic leading edge may be configured to have different fracture resistance in a region towards the blade root than in a region towards the blade tip.

The metallic leading edge may be configured to have region having a different fracture resistance in a central spanwise region than in a region near the blade tip or the blade root.

The leading edge may be configured such that the fracture resistance progressively changes in a direction from the blade tip to the blade root.

The fracture resistance may decrease in a direction from the blade tip to the blade root. Alternatively, the fracture resistance may increase in a direction from the blade tip to the blade root.

The metallic leading edge may include two wings and a fore portion provided between the two wings.

The fore portion may be configured to have a different fracture resistance in a region towards the blade root than in a region towards the blade tip.

The leading edge may be formed in two parts. The two parts may be connected together in a region of the fore portion.

The two parts may be bonded together and a bondline connecting the two parts has a different strength in a region towards the blade root than in a region towards the blade tip.

For example, the bondline connecting the two portions may be weaker in a region proximal to the blade tip than in a region proximal to the blade root. Alternatively the bondline connecting the two portions may be weaker in a region proximal to the blade root than in a region proximal to the blade tip.

The two portions of the leading edge may be bonded together along the entire spanwise direction of the leading edge, but the strength of the bond may be varied, for example by varying the heat treatment applied to the bond, or by varying the parameters of the bonding method (e.g. welding method).

The bondline may include bonded areas and non-bonded areas.

The non-bonded areas may extend in a spanwise and a chordwise direction. The non-bonded areas may be slot shaped, oval or circular in shape. The non-bonded areas may be planar surfaces not bonded to an adjacent surface. Alternatively, the non-bonded areas may be provided by holes and/or cavities.

The percentage of bonded area to non-bonded area may be greater in a region near the blade tip than in a region near the blade root.

Alternatively the percentage of the bonded area to non-bonded area may be greater in a region near the blade root than in a region near the blade tip.

The two parts may be connected together using welding (e.g. electron beam welding) or diffusion bonding.

The fracture resistance in a region towards the blade root may be reduced compared to the fracture resistance towards the blade tip.

The leading edge may be made by additive manufacture. Alternatively, by way of example only, the leading edge may be machined from solid, forged, cast or metal injection moulded.

The leading edge may include a crack initiator for selectively initiating cracking of the metallic leading edge, e.g. if a blade is released from the turbomachine in use.

The crack initiator may be provided at the metallic leading edge.

The crack initiator may be provided at the tip of the blade.

For example, the crack initiator may not extend beyond a region defined by the metallic leading edge. Alternatively, the crack initiator may extend past the leading edge of the blade to a core of the blade.

The crack initiator may be a weakened region that is more susceptible to cracking than the remainder of the metallic leading edge.

The crack initiator may comprise a leading edge cap positioned at the blade tip.

The cap may be a wedge shaped insert having a reduced width in a direction from the blade tip towards the blade root, width being measured in a direction from a pressure side to a suction side of the blade.

For example, the insert may be shaped so as to be wider at the tip of the leading edge than in a region away from the tip of the leading edge. The wedge shaped cap may be shaped so that the sides taper to a point. The sides may be planar and angled to a point.

The cap may include shoulders that when in a non-failure condition rest on a region of the fore portion of the leading edge.

The blade may be a fan blade for a gas turbine engine.

The blade may be a composite fan blade for a gas turbine engine, and wherein the blade comprises a composite core to which the metallic leading edge is attached.

A second aspect of the invention provides a method of manufacturing a blade including manufacturing a metallic leading edge configured to have a region having varying fracture resistance in a spanwise direction.

The method may include providing a blade core having a leading edge, a trailing edge, a tip, a root, a suction surface and a pressure surface. The method may include connecting the metallic leading edge to the blade core.

The metallic leading edge may be made using additive manufacturing.

The metallic leading edge may be made in two portions that are connected together. The two portions may be bonded together using electron beam welding.

The fracture resistance of the leading edge may be varied by varying the power of the electron beam welding.

The two portions may be bonded together using diffusion bonding.

The fracture resistance of the leading edge may be varied by selectively coating the surface of one or both of the portions along the bondline with a material that prevents diffusion bonding.

The manufactured blade may be a blade according to the first aspect.

DESCRIPTION OF DRAWINGS

The invention will now be described, by way of example only, with reference to the accompanying drawings in which.

DETAILED DESCRIPTION

Figure 1:
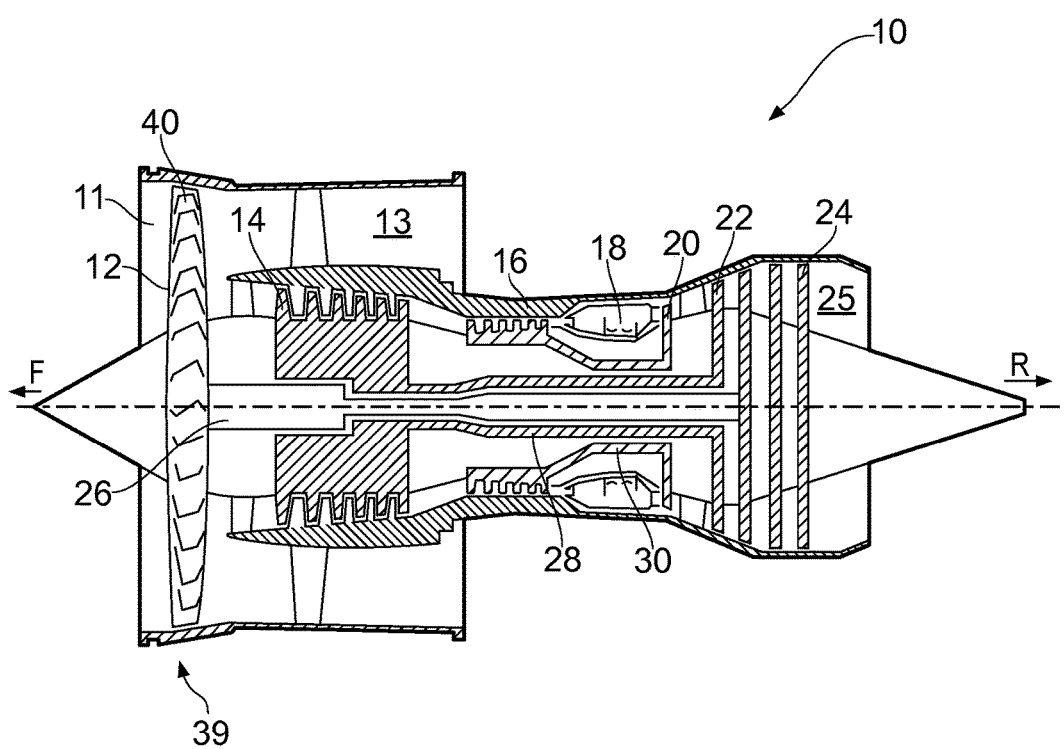
FIG. 1 illustrates a gas turbine engine.

With reference to FIG. 1 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. The fan blades are circumscribed by a fan casing 39. The fan casing includes a liner proximal to the fan blades.

In the present application a forward direction (indicated by arrow F in FIG. 3) and a rearward direction (indicated by arrow R in FIG. 3) are defined in terms of axial airflow through the engine 10.

Figure 2:
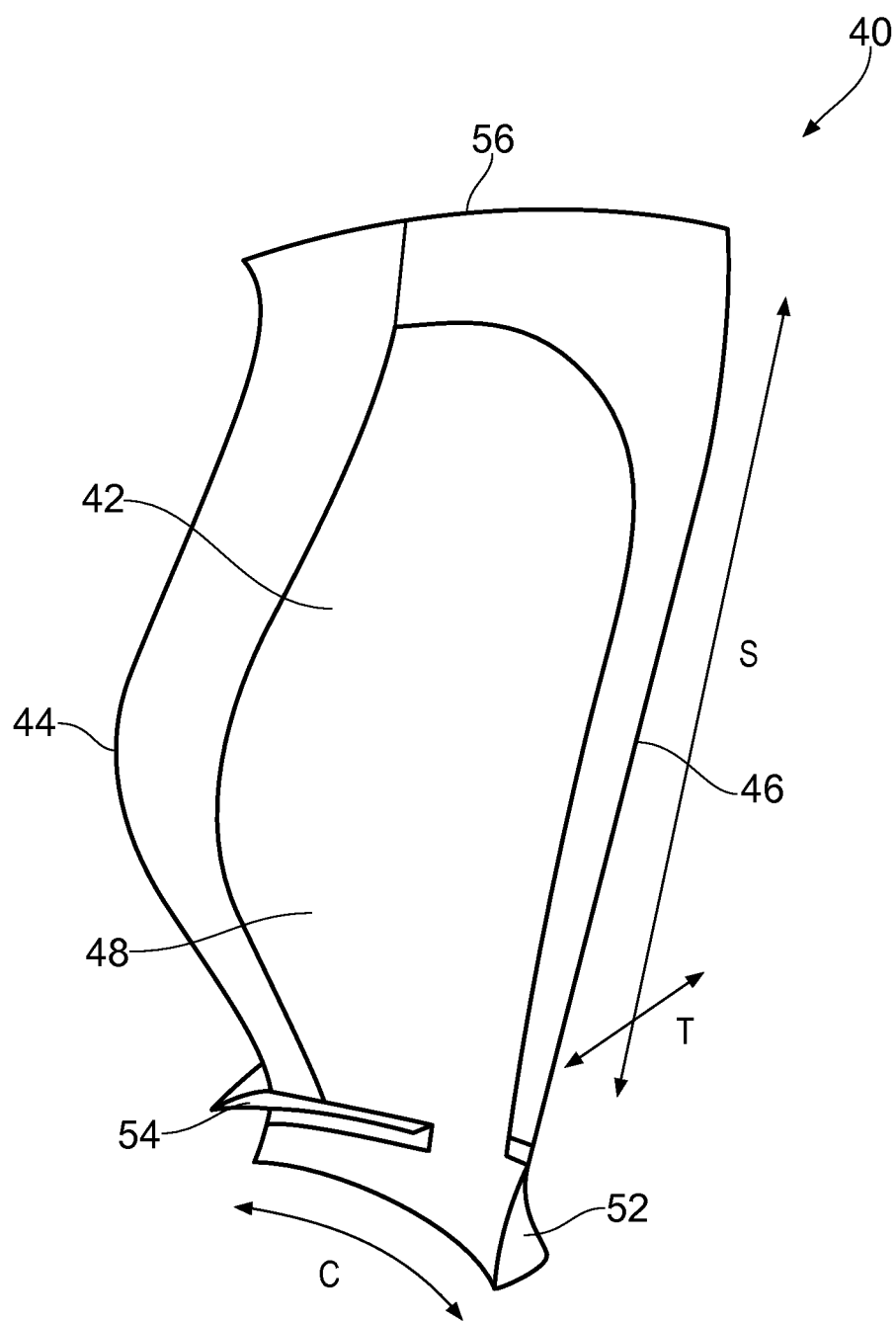
FIG. 2 illustrates a composite fan blade.

Referring to FIG. 2, the fan blades 40 each comprise an aerofoil portion or core 42 having a leading edge 44, a trailing edge 46, a concave pressure surface 48 extending from the leading edge to the trailing edge and a convex suction surface (not shown in FIG. 2 but indicated at 50 in FIG. 3) extending from the leading edge to the trailing edge. The fan blade has a root 52 via which the blade can be connected to the hub. The fan blade has a tip 56 at an opposing end to the root. The fan blade may also have an integral platform 54 which may be hollow or ribbed for out of plane bending stiffness. The fan blade includes a metallic leading edge 44 covering the leading edge of the core and extending along a portion of the pressure surface and suction surface of the core. The fan blade also includes a metallic trailing edge covering the trailing edge of the core and extending along a portion of the pressure surface and the suction surface of the core.

In the present application, a chordwise direction C is a direction extending between the leading edge and the trailing edge; a spanwise direction S is a direction extending between the tip of the blade and the root 52 of the blade 40; and the thickness direction T is a direction extending between the pressure surface 48 and the suction surface 50 of the blade 40.

Figure 3:
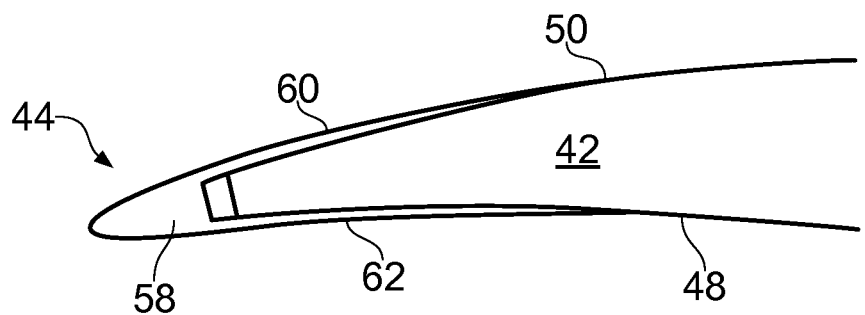
FIG. 3 illustrates a partial cross section of the composite fan blade of FIG. 2.

Referring now to FIG. 3, the metallic leading edge includes a fore portion 58 provided between two wings 60, 62. One of the wings 60 extends partially along the suction side of the core 42 and the other of the wings 62 extends partially along the pressure side of the core.

Figure 4:
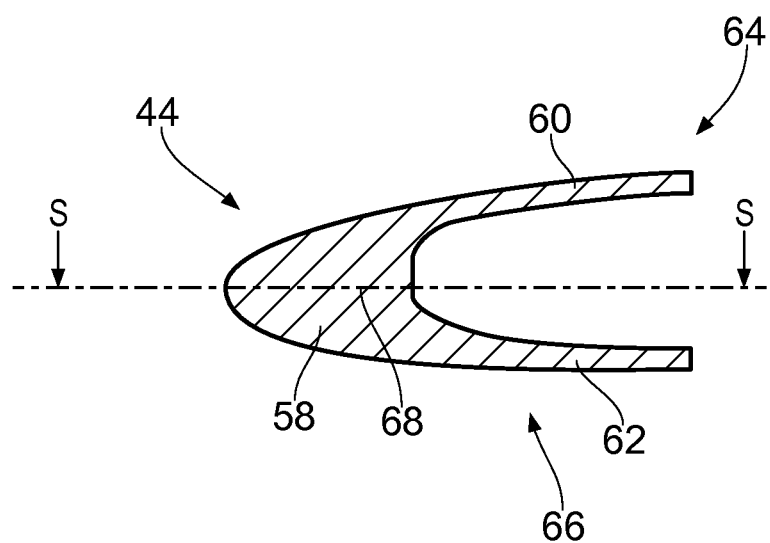
FIG. 4 illustrates a cross section of a metallic leading edge of the composite fan blade of FIG. 2.

Referring to FIG. 4, in the present embodiment the metallic leading edge is formed of a first portion 64 and a second portion 66 connected together in a region of the fore portion. Each of the first portion and the second portion form one wing 60, 62 and part of the fore portion 58. In the present embodiment, the first portion and the second portion connect in a central region of the fore portion. The first portion and the second portion are bonded together along a bondline 68.

The fracture resistance of the bondline 68 is varied in a radial direction from a position near the blade root to a position near the blade tip. In the present embodiment the fracture resistance is progressively varied along the length (in a spanwise direction) of the metallic leading edge 44.

In the present embodiment the fracture resistance near the blade root 52 is less than the fracture resistance near the blade tip 56, but in alternative embodiments the fracture resistance near the blade tip may be less than the fracture resistance near the blade root.

The fracture resistance can be varied by introducing a pattern of one or more bonded areas and one or more non-bonded areas along the bondline, e.g. at the interface between the first portion and the second portion. For example, in the region near the tip the percentage of area of the first portion bonded to the second portion may be greater than in a region near the root. When designing the bond strength along the length of the leading edge (including where applicable the pattern of bonded and non-bonded areas) the bond strength should be configured so that the leading edge can withstand impacts that occur during flight, for example foreign object impact.

Figure 5:
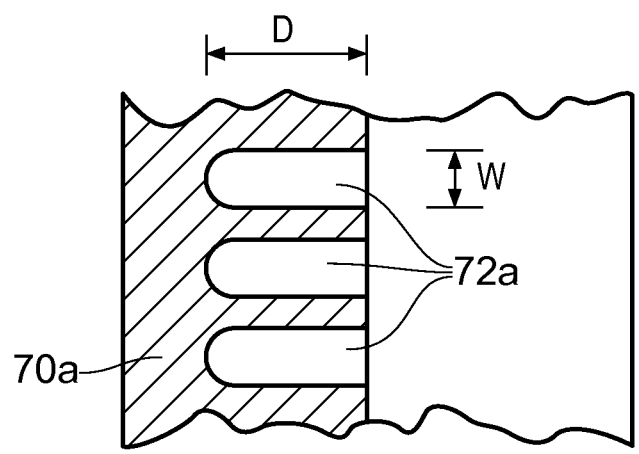
FIG. 5 illustrates a partial section view of the metallic leading edge of FIG. 4 along the line S-S at a position near the tip of the fan blade.
Figure 6:
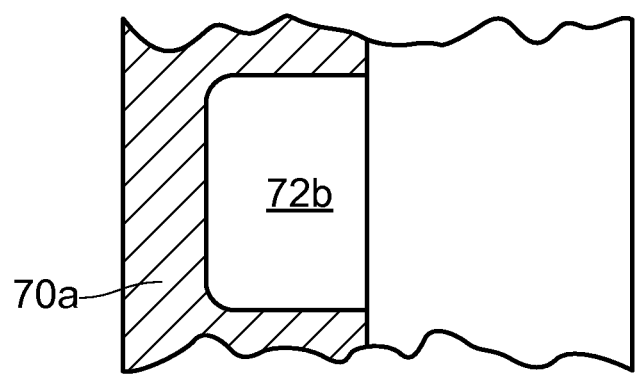
FIG. 6 illustrates a partial section view of the metallic leading edge of FIG. 4 along the line S-S at a position near the root of the fan blade.

Referring to FIGS. 5 and 6, the bondline in a region near the tip (illustrated in FIG. 5) and the bondline in a region near the root (illustrated in FIG. 6) can be compared. The bondline 58 in a region near the tip includes a bonded area 70a and a plurality of non-bonded areas 72a. The bondline 58 in a region near the root has a bonded area 70b and a non-bonded area 72b. The non-bonded area 72b near the root is larger than the non-bonded area 72a near the tip. The width W (in a radial or spanwise direction) and the depth D (in an axial or chordwise direction) of the non-bonded area can be altered to increase the non-bonded area.

Altering the properties of the bondline along the length of the leading edge means that in the event of the leading edge impacting the fan casing, the leading edge can split or break up in a controlled manner. The controlled splitting or breaking up of the leading edge transfers less impact energy to the casing than the leading edges of the prior art. The reduction in energy transferred to the casing in the event of the leading edge impacting the liner or casing means that the weight of the liner and casing can be reduced.

In the described embodiment, where the fracture resistance is reduced in a region near the blade root compared to a region near the blade tip, the metallic leading edge is progressively easier to split or fragment near the blade root. In the event of a fan blade being released from the fan and impacting the fan case liner, bending loads will be exerted on the leading edge causing the leading edge to crumple. Varying the fracture resistance of the metallic leading edge means that the leading edge can "unzip" under applied local shear, tension and compressive forces resulting from the globally applied bending force.

To manufacture a blade 40 of the described embodiment, the first portion and the second portion may be made using additive manufacture, machining from solid or any suitable metal forming method. The first portion may be bonded to the second portion using welding, e.g. electron beam welding, or diffusion bonding. In the case of electron beam welding, the bonded and non-bonded areas can be formed by controlling the electron beam welding power. In the case of diffusion bonding, a ceramic (e.g. yttria) bond mask can be used to cover the non-bonded areas along the bondline.

As will be appreciated by the person skilled in the art, the pattern of the bonded and non-bonded areas may be varied from that illustrated. For example, the non-bonded areas may have a circle or oval shape rather than a slot shape. The size of the circle or oval shape may vary along the length of the leading edge. Further alternative embodiments may have non-bonded areas of shapes that form a cluster with stippling or graduated in size, in yet further alternative embodiments a pattern of tessalating bonded and non-bonded areas may be provided.

Figure 7:
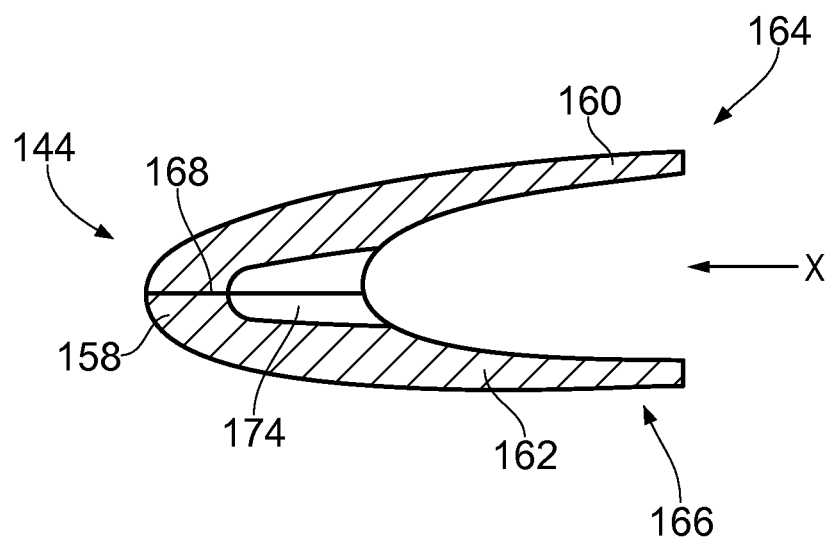
FIG. 7 illustrates a cross section of an alternative metallic leading edge.
Figure 8:
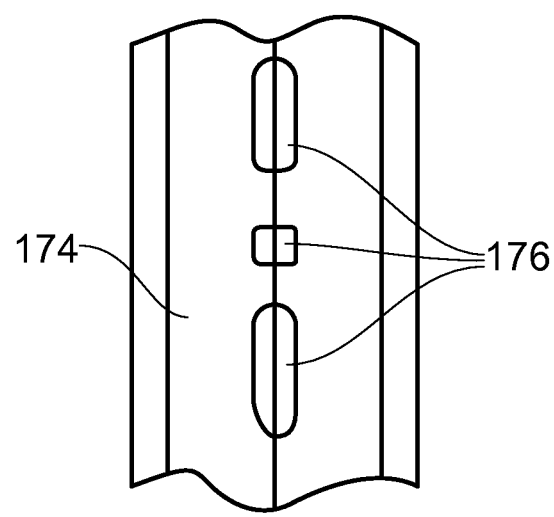
FIG. 8 illustrates a partial view of the leading edge of FIG. 7 in the direction indicated by arrow X in FIG. 7.

A further alternative embodiment is illustrated in FIGS. 7 and 8. In the embodiment shown in FIGS. 7 and 8 similar features are given similar reference numerals as the previously described embodiment but with the prefix "1". The leading edge 144 of FIGS. 7 and 8 includes a plurality of cavities 174 provided along the length of the leading edge to vary the fracture resistance. Further, the leading edge is provided with a plurality of holes 176. The cavities 174 and the holes 176 define the non-bonded areas. The thickness of the cavities and holes in the thickness direction, spanwise direction and chordwise direction can be varied to vary the fracture resistance. In the embodiment of FIGS. 7 and 8 both a cavity and holes are provided but as will be appreciated by the person skilled in the art, either one or the other of a cavity or holes may be provided.

In exemplary embodiments a crack initiator may be provided. For example a crack initiator may be provided at the tip of the leading edge. The crack initiator may be a locally weakened region at the tip of the leading edge. Alternatively, the crack initiator may be a cap provided at the tip of the leading edge.

Figure 9:
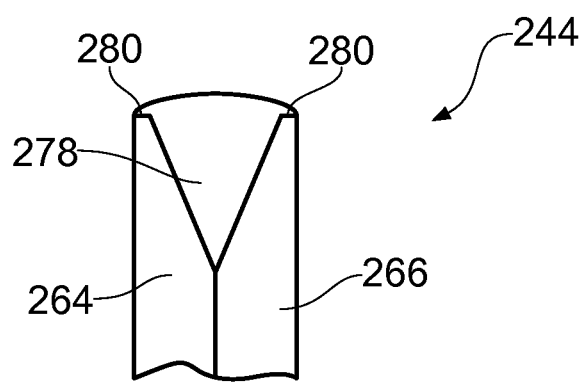
FIG. 9 illustrates a partial cross section of a crack initiator provided at the tip of a metallic leading edge of a fan blade.
Figure 10:
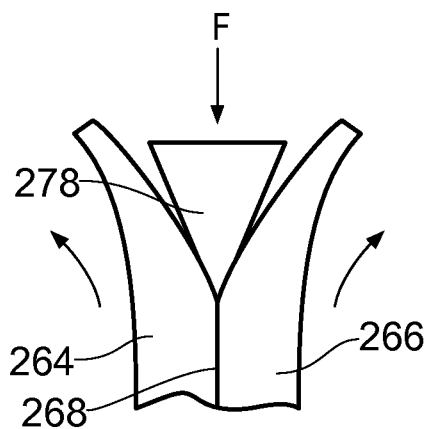
FIG. 10 illustrates a partial cross section of the crack initiator and metallic leading edge of FIG. 8 in the event of the leading edge impacting a fan casing or liner.

Referring to FIGS. 9 and 10, an example of a crack initiator in the form of a cap 278 is shown. In the example shown the cap 278 defines a wedge shaped insert. The wedge shaped insert has increased width at the tip of the blade than in a region towards the blade root. Width is measured in the thickness direction. The insert tapers to a point substantially coincident with the bondline 268 connecting the first and second portions 264, 266. The sides of the insert are planar and angled towards the bondline. In the presently described embodiment the cap includes shoulders 280 that rest on the first and second portions of the leading edge 244.

In the event of a blade being released from the fan, the fan blade will impact the liner of the casing. Said impact force (indicated by arrow F in FIG. 10) loads the cap 278 to drive the cap down along the bondline 268 between the first and second portions 264, 266 so as to initiate cracking or splitting of the leading edge 244 along the bondline.

In the described embodiment the cap 278 extends along the chordal length of the fore portion of the leading edge, but not beyond the extent of the metallic leading edge. However, in, in alternative embodiments the cap may extend from the leading edge to the trailing edge, or any distance therebetween. When the cap extends to a region of the composite core, the cap can be used to initiate splitting of the composite ply layers so as to assist collapse of the entire fan blade.

The cap 278 may be bonded to the first and second portions of the leading edge. The strength of the bond between the cap and the first and second portions and the shape of the cap can be used to control the impact force required to initiate cracking or splitting of the leading edge. For example, the angle of the wedge or the spanwise length of the insert can be used to vary the impact force required to initiate cracking of the leading edge.

The strength of the bond between the first portion and the second portion should be selected so that cracking is only initiated in the event of a fan blade being released from the fan and not during other impact events the fan blades experience. The shoulders provided on the cap can help to regulate the impact force required to initiate cracking. The shoulders can be configured to shear off under the impact loads experienced when a fan blade is released.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

For example, in the described embodiments the leading edge is manufactured in two portions that are bonded together. However, in alternative embodiments the leading edge may be made as a single component. When the leading edge is manufactured as a single component the leading edge may be manufactured using additive layer manufacture and the weakened regions may be provided by including voids or cavities in the leading edge. Alternatively the single component may be made by a metal forming method and local heat treatment of the component, and/or the provision of holes and/or cavities, may be used to tailor the fracture resistance in different regions of the leading edge.

In the present application the leading edge has been shown as having two wings, but in alternative embodiments the leading edge may have a "bullet" shape, that is the leading edge may be substantially free from wings.

The fan blade described is a composite blade with a metallic leading edge. However, the leading edge may be a leading edge of a metallic blade. In such embodiments, the leading edge may be integrally formed with the core of the blade.

The invention claimed is:

1. A turbomachine blade comprising:
a root and a tip of the turbomachine blade; and
a metallic leading edge having a region with varying fracture resistance in a spanwise direction that increases energy absorption by the metallic leading edge in the event of the turbomachine blade being released from a turbomachine and impacting a casing of the turbomachine, the region of varying fracture resistance of the metallic leading edge including a sequence of bonded regions and non-bonded regions, wherein:
a ratio of bonded area to non-bonded area of the sequence is greater at the tip of the turbomachine blade than at the root of the turbomachine blade, and
the fracture resistance of the metallic leading edge progressively increases from the root of the turbomachine blade to the tip of the turbomachine blade.

2. The turbomachine blade according to claim 1, wherein the metallic leading edge includes two wings and a fore portion provided between the two wings.

3. The turbomachine blade according to claim 2, wherein the fore portion is configured to have a different fracture resistance in a region towards the root of the turbomachine than in a region towards the tip of the turbomachine.

4. The turbomachine blade according to claim 2, wherein the leading edge is formed from two parts, the two parts being connected together in a region of the fore portion.

5. The turbomachine blade according to claim 4, wherein the two parts are bonded together and a bondline connecting the two parts has a different strength in a region towards the root of the turbomachine than in a region towards the tip of the turbomachine.

6. The turbomachine blade according to claim 5, wherein the bondline includes the bonded regions and the non-bonded regions.

7. The turbomachine blade according to claim 5, wherein the two parts are connected together using welding or diffusion bonding.

8. The turbomachine blade according to claim 1, wherein the fracture resistance in a region towards the root of the turbomachine blade is reduced compared to the fracture resistance towards the tip of the turbomachine blade.

9. The turbomachine blade according to claim 1, wherein the leading edge is made by additive manufacture.

10. A gas turbine engine comprising a fan having a plurality of turbomachine blades according to claim 1.

11. A method of manufacturing a blade including:
manufacturing a metallic leading edge, and varying the manufacturing process or including weakening features in the metallic leading edge such that the metallic leading edge is configured to have varying fracture resistance in a spanwise direction, the weakening features increasing energy absorption by the metallic leading edge in the event of the blade being released from a turbomachine and impacting a casing of the turbomachine, the metallic leading edge including a sequence of bonded regions and non-bonded regions, wherein:
a ratio of bonded area to non-bonded area of the sequence is greater at a tip of the blade than at a root of the blade, and
the fracture resistance of the metallic leading edge progressively increases from the root of the blade to the tip of the blade.

12. The method according to claim 11, wherein the metallic leading edge is made using additive manufacturing.

13. The method according to claim 12, wherein the metallic leading edge is made in two portions that are connected together.

* * * * *